(12) United States Patent
Boaz

(10) Patent No.: US 6,209,768 B1
(45) Date of Patent: Apr. 3, 2001

(54) REMOVABLE PACKAGE CARRIER FOR AUTOMOBILES

(76) Inventor: Yosef D. Boaz, 4718 Meridian Ave. #209 PMB, San Jose, CA (US) 95118

( * ) Notice: Subject to any disclaimer, the term of this patent is extended or adjusted under 35 U.S.C. 154(b) by 0 days.

(21) Appl. No.: 09/546,118

(22) Filed: Apr. 10, 2000

(51) Int. Cl.[7] .................................................. B60R 9/045
(52) U.S. Cl. ........................ 224/314; 224/318; 224/324; 224/329; 224/563; 224/567; 224/572; 224/580; 410/100
(58) Field of Search .................................. 224/563, 567, 224/572, 309, 314, 317, 318, 324, 327, 328, 329, 580, 585; 410/97, 100

(56) References Cited

U.S. PATENT DOCUMENTS

| | | | |
|---|---|---|---|
| 1,196,762 | * 9/1916 | Cunningham | 224/563 |
| 1,552,563 | * 9/1925 | Labisky | 224/567 |
| 2,268,881 | 1/1942 | LeBoeuf . | |
| 3,000,418 | * 9/1961 | Bitting | 224/309 |
| 3,610,490 | * 10/1971 | Smith | 224/327 |
| 3,670,934 | * 6/1972 | Kraselsky | 224/329 |
| 4,050,614 | 9/1977 | Simpson . | |
| 5,148,956 | * 9/1992 | Funk | 224/209 |
| 5,193,955 | * 3/1993 | Chou | 410/97 |
| 5,288,003 | 2/1994 | MacDonald . | |
| 5,458,447 | * 10/1995 | Clason | 410/100 |
| 5,927,575 | * 7/1999 | Gatling | 224/153 |

* cited by examiner

Primary Examiner—Stephen P. Garbe
(74) Attorney, Agent, or Firm—Howard E. Lebowitz

(57) ABSTRACT

A package carrier for carrying articles on the trunk lid of a passenger car or the tail gate of a utility vehicle comprising a soft, flat, flexible pad with a plurality of adjustable mounting straps terminating with hooks for attaching the carrier to the vehicle and a plurality of independent binding straps for holding the package in place. The package carrier is capable of conforming to the shape of the trunk lid so that it can be efficiently used with a wide range of vehicles, is quickly deployed and removed, and can be rolled up into a compact cylinder for storage.

22 Claims, 3 Drawing Sheets

REMOVABLE PACKAGE CARRIER FOR AUTOMOBILES

BACKGROUND OF THE INVENTION

1. Field of the Invention

The field of the invention is package carriers for transporting packages on the trunk of automobiles or the tail gate of utility vehicles.

2. Description of the Prior Art

There are a numerous devices for securing packages to the outside of automobiles and utility vehicles. Many of these devices utilize a structure which is permanently attached to the vehicle, such as rails or tracks attached to the roof or trunk lid, to which packages can be tied with rope or elasticized bungee chords. Others include removable storage cases which are mounted on the roof or trunk lid, including removable containers, such as the carrier disclosed in U.S. Pat. No. 4,050,614 which comprises a storage container which can be mounted on a trunk lid with hooks which are operatively associated with the front end of the container and with side hooks which are operatively associated with lateral straps which help hold down the container, but not attached on the rear end. Another removable container is disclosed in U.S. Pat. No. 5,288,003 which is a container designed to fit on roofs of aerodynamically streamlined cars which comprises a container which is secured by straps which are affixed to the top of the container and include novel hooks which secure through the car doors.

A disadvantage of trunk top carriers which include a container or a fixed structure is that the size of the container is effectively limited to by the dimensions of the unobstructed flat space available on the top horizontal portion of the trunk. There is no standard shape or size for a trunk lid. The length of the flat horizontal surface (the dimension starting at the hinged opening of the trunk and ending where the lid bends down) varies from ten inches or less to several feet. Many of today's compact and sub-compact cars have smaller sized trunk lids. The problem of fitting a container on a trunk lid is further confounded by the popular trend of placing an aerodynamic obstruction (often called a spoiler) at the end of the horizontal surface of the trunk lid thus reducing the useable length still further. Thus, while it is possible to make a "one size fits all" carrier which includes a container or a structure which is designed to fit on the horizontal trunk surface, such a device would necessarily be very small and would not make good use of the space available on larger vehicles.

The great variety of trunk mounted package carrier designs available for cars is good evidence of the utility of such devices, however it is apparent that there is not a suitable portable carrier for smaller cars due to the small size of the available flat space on the trunk lid. Yet the need for such a device is greatest on small cars because the carrying capacity inside of the trunk is so small. It is also clear that a readily removable device would be very desirable, since most such devices are used relatively infrequently.

There is a need for a package carrier which would be suitable for use on a wide range of vehicle sizes irrespective of the trunk lid dimensions while still being able to carry a large package.

There is a need for a package carrier that could be quickly attached when needed and removed when not in use, and which could be rolled up into a compact package for stowage when not in use.

There is a need for a package carrier which could be efficiently used on a large variety of vehicle designs, irrespective of trunk proportions.

SUMMARY OF THE INVENTION

My invention regards a package carrier which is designed to be mounted onto the trunk lid of an automobile or the tail gate of a utility vehicle. One embodiment of the package carrier comprises a flat, flexible, essentially rectangular pad with a plurality of elongated mounting straps. Each mounting strap comprises a long strip of fabric which traverses the pad and has free ends extending on two opposing sides of the pad. Broad flat hooks are attached to each of the ends. The mounting straps are attached to the pad near two opposite edges of the pad, so that each strap is attached in two places. There are at least two mounting straps which traverse the pad across the two long edges of the pad, and optionally at least one strap which traverses the pad across the two short edges of the pad. At least one side of each strap has an adjustment connector by which the distance between the edge of he pad and the hook can be varied. Some of the mounting straps may also contain a pivotal connection. The pad also contains a plurality of binding straps each of which also traverses the pad, is attached to the pad near each of two opposing edges, and has free ends extending on two opposing sides of the pad. There are at least three binding straps which traverse the long edges of the pad, and at least two straps which traverse the short edges of the pad. The binding straps each contain a connection buckle, with one part of the buckle on each free end of the strap, and at least one member of the buckle pair contains an adjustment connector by which the distance between the edge of he pad and the hook can be varied. Alternatively, a separate adjustment connector may be supplied.

In alternate embodiment, some or all of the mounting and binding straps which traverse the pad may be replaced with two separate straps attached opposite each other on opposing sides of the pad proximate to the respective edge.

The pad preferably comprises two layers with the straps attached to each layer and running between the layers.

The device is deployed by attaching the mounting strap hooks on one of the long sides of the pad under the hinged side of the lid so that the pad rests on the trunk lid, attaching the mounting straps on the short sides of the pad under the trunk lid sides and tightening the fit with the adjustment connector on the short sides, attaching the mounting strap hooks on the remaining long side of the pad under the open side of the trunk lid, and tightening the fit with the adjustment connector on the long sides. On most vehicles this can be accomplished without opening the trunk lid. Depending on the size and proportions of the trunk lid, the pad may rest entirely on the horizontal surface of the trunk lid or bend around the lid and rest part on the horizontal surface and part on the vertical surface. The item to be carried is rested on the closed trunk lid and secured in place by the binding straps the ends of which are fastened together by fastening the parts of the connection buckle and tightening the adjustment connector.

Important aspects of the invention are a soft flexible pad which can conform to the shape of the trunk lid, adjustable attachment straps with hooks for attaching the device to the vehicle , and independent binding straps for securing the package.

An object of this invention is to provide a removable, portable package carrier that is suitable for use on many different vehicles while making efficient use of the space available on the trunk notwithstanding substantial differences in trunk sizes and proportions.

A further object of the invention is to provide a package carrier which can be rolled up into a tight compact cylinder for stowage in a small space when not in use.

A still further object of the invention is to provide a package carrier which can be quickly deployed from the stored condition when needed and quickly removed and stored when not in use.

BRIEF DESCRIPTION OF THE DRAWINGS

These and other features, aspects and advantages of the present invention will become better understood with regard to the following description, appended claims and accompanying drawings, where:

DESCRIPTION

Figure 1:
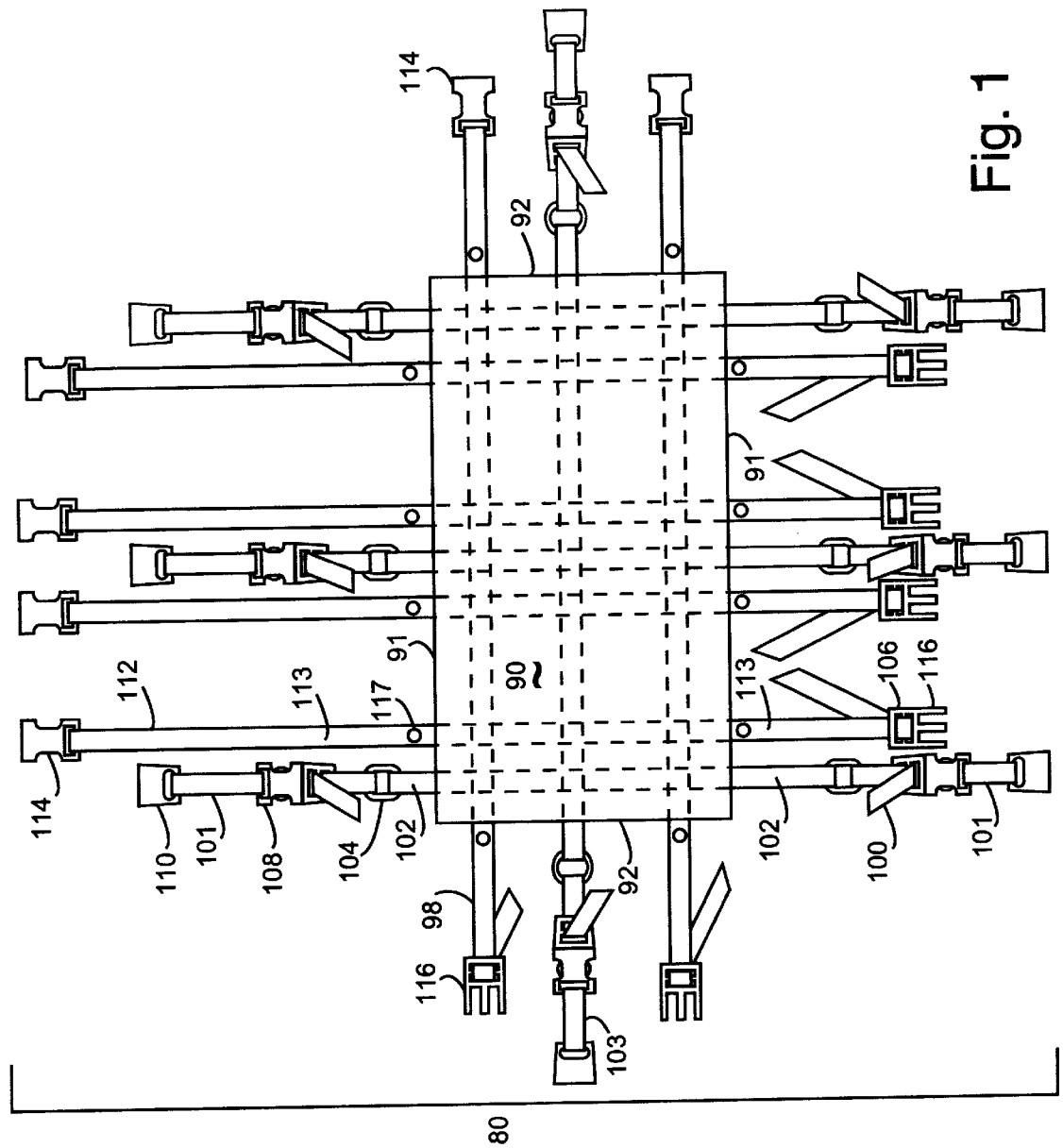
FIG. 1 shows a top view of an embodiment of the invention.

FIG. 1 shows a preferred embodiment of the invention. The package carrier 80 comprises a soft flexible rectangular pad 90 with three mounting straps 100 traversing the pad across the two long edges 91 of the pad. Each mounting strap has a fabric strip 102 which traverses the pad and has two free sides 101 one on either side of the pad. Each of the free sides includes an integrated snap-buckle-adjustment set 108 and a hook 110 attached at the end of the strap. The free sides on one side of the pad also include D-rings 104. Another mounting strap 103 traverses the pad across the two short edges 92 of the pad having two free sides one on either side of the pad. Each free side has an integrated-snap-buckle-adjustment set, a D-ring, and a hook at the end. The carrier also includes four binding straps 112 which traverse the pad across the two long edges 91 of the pad. Each binding strap has a fabric strip 113 which traverses the pad and two free sides one on each side of the pad. Each free side contains one of the parts of an integrated snap-buckle-adjustment set, a male part 116 and a female part 114. As shown on FIG. 1, the male part contains the adjustment portion 106 of the integrated snap-buckle-adjustment set. There are also two binding straps 98 which traverse the pad across the two short edges 92 of the pad, each having two free ends, each free end having one part of an integrated snap-buckle-adjustment set. The pad is surrounded by grommet holes 117 located on the binding straps.

Figure 2:
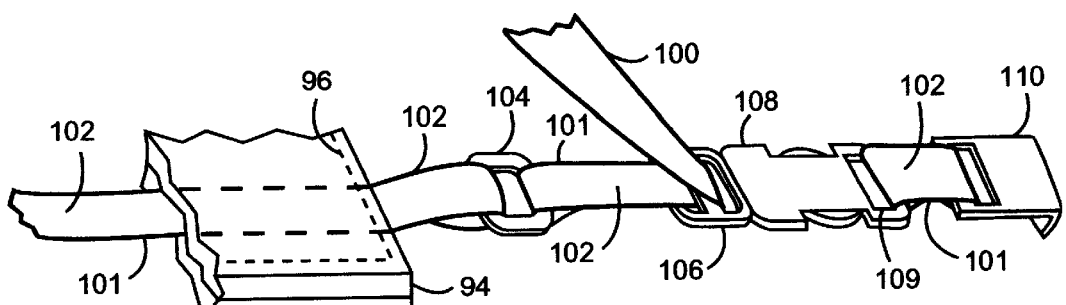
FIG. 2 shows an enlarged view of a typical mounting strap as attached to the pad.

FIG. 2 shows an enlarged view of a mounting strap attached to the pad. It can be seen that the pad has two layers a lower layer 93 and an upper layer 94. The fabric strip 102 is shown stitched 96 between the layers near the edge of the pad. A metal D-Ring 104 is shown permanently attached to the fabric strip on both sides by loops of fabric which are stitched back onto the main body of the strip. The fabric strip is next attached to the adjustment end 106 of a fastened integrated snap-buckle-adjustment set. The fabric can be pulled through the adjustment end to vary the length of the strap. The other end of the set is permanently attached to the fabric by a loop of fabric stitched to the main body of the strip passing through the slot 109. The fabric strip is finally permanently attached to the hook 110 by a loop of fabric through the slot in the hook which is stitched to the main body of the strip.

Figure 3:
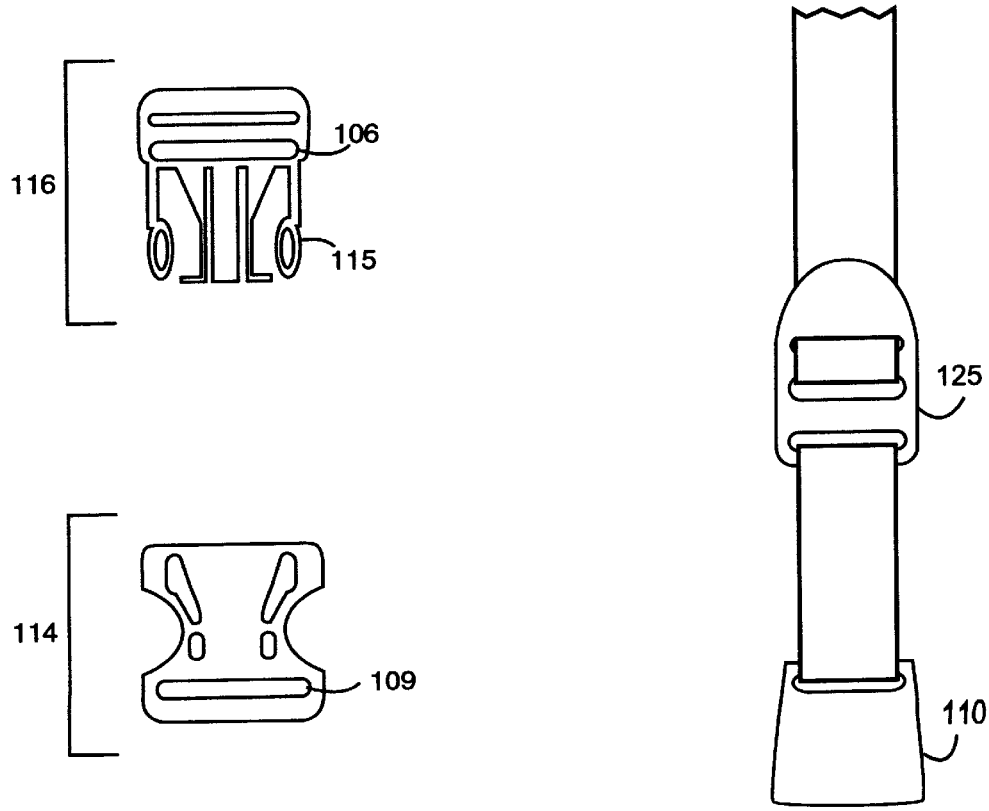
FIG. 3 shows male and female members of an integrated snap-buckle-adjustment set, and a separate adjustment connector.

FIG. 3 shows a larger view of the parts of the integrated snap-buckle adjustment-set. The male part 116 of the connector fits into the female part 114 when the outer prongs 115 of the male part are compressed together and locks in place when the compression is removed and the outer prongs spring back to their original position. The strap length is adjusted by feeding a part of the fabric strip through the adjustment portion 106 which is an integral part of the male part. Also shown is a stand alone adjustment connector 125 which can be used as an alternative to the integrated-buckle-adjustment connector on the mounting straps.

Figure 4:
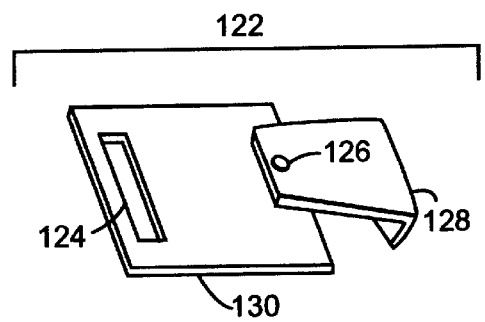
FIG. 4 shows an alternative swivel hook.

FIG. 4 shows a swivel hook 122, an alternative to the D-Ring as pivotal connector for the mounting straps. A flat plate 130 is permanently attached to the fabric strip by a loop of fabric through a slot 124 at one end of the flat plate. The modified hook 128 is attached to the plate pivotally with a pivot pin 126.

Figure 5:
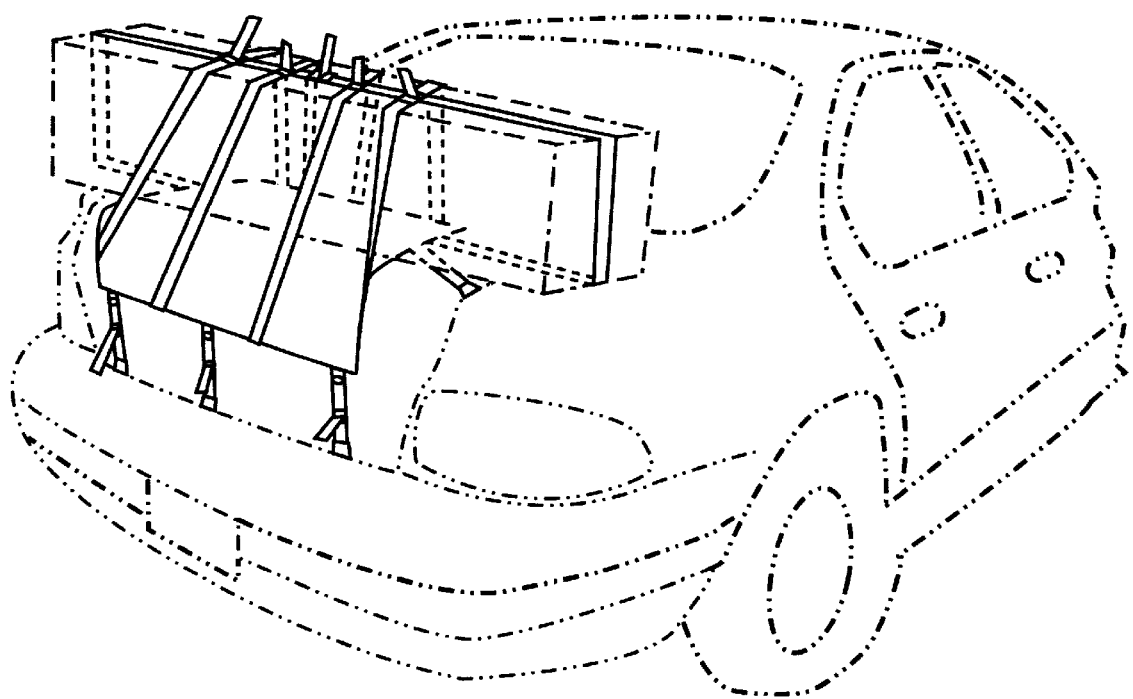
FIG. 5 is a perspective view of the package carrier deployed on a trunk lid.

FIG. 5 shows a version of the package carrier deployed on the trunk of a vehicle with a small horizontal surface. The carrier is shown with the pad conforming to the horizontal and vertical surfaces of the trunk lid.

An important feature of the invention is that the pad and mounting straps and binding straps be made of a flexible material that can bend and conform to the trunk lid surfaces so that a carrier can accommodate a wide range of sizes and proportions. It is also desirable that the materials be strong and water resistant. A preferred material for the pad is polyvinyl chloride matting with multiple strands of nylon linear fiber impregnated into padding. A preferred type of matting has breathing holes to allow air flow through the pad. A preferred material for the fiber strip of the binding and mounting straps is nylon webbing. A preferred method of attaching the straps to the pad is sewing, though such methods as adhesive, ultra-sonic welding, and rivets may be readily used. Other synthetic materials may certainly be used for the pad, for example Naugahyde. The pad and straps could also be made of leather. I prefer to have a pad with two layers, particularly with a low density material such as polyvinyl chloride, but a single layer pad is also feasible particularly with a material such as leather. When a two layer pad is used, I prefer to have the mounting and binding straps run between the layers. The straps should be attached to the straps near each of the edges of the pad which are crossed. The pad is preferably surrounded by grommet holes which can be used to attach a cover by stringing chord through the holes in the pad and corresponding holes in the cover.

At least two mounting straps are needed crossing the pad across the long edges, and preferably at least one crossing the short edges. I prefer three mounting straps crossing the long edges of the pad and one mounting pad crossing the short edges. The mounting straps need to be adjustable so that the carrier can accommodate a wide range of trunk sizes. At least one side of each mounting strap should have an adjustment connector by which the length of the strap can be varied. I prefer to have an adjustment connector on both sides of the mounting straps. I prefer to use a an adjustment connector that is part of an integrated buckle-adjustment set such as the integrated snap-buckle-adjustment set 108 wherein the adjustment portion is an integral part of one of the connector parts, in this case the male part 116. Other types of two part connectors with an adjustment portion are satisfactory as well, such as a center or top release buckle where there are two parts, one of which fits into the other and is captured by a mechanism and released by releasing the mechanism. Stand alone adjustment connectors 125 are also available and can be used, though I prefer the connectors which are part of a buckle-adjustment set because they are more substantial. Each mounting strap includes a broad flat hook for a firm connection to the trunk lid. I prefer a polyvinyl chloride coated steel hook approximately three inches wide with about a one quarter inch bend at its front side. Some trunk lids have a curved edge or side which would be difficult to accommodate if all the hooks had a fixed orientation. I prefer to include a pivotal connector on one side of at least two of the mounting straps crossing the long sides of the pad and on both sides of a mounting strap crossing the short sides of the pad. A preferred pivotal connector is a D-Ring 104 which allows the hook ends of the strap considerable freedom of rotation. Another pivotal connector is a swivel hook 128 on FIG. 5 wherein the hook is attached to a plate 122 by a pivot pin 126. This connector accomplishes an equivalent result of allowing the hook freedom of rotation. Other equivalent structures will be apparent which allow the hook to rotate on a horizontal plane, which would be acceptable pivotal connectors.

At least three binding straps are preferred crossing the pad across the long edges and at least two binding straps are preferred crossing the pad across the short edges. I prefer four binding straps crossing the long edges and two binding straps crossing he short edges. Each binding strap preferably has an integrated buckle-adjustment set deployed with one part of the set on each side of the strap. An integrated snap-buckle-adjustment set is preferred because they are inexpensive and easy to operate and form a strong and secure closure. Other buckle-adjustment sets are acceptable such as a center or top release buckle where there are two parts, one of which fits into the other and is captured by a mechanism and released by releasing the mechanism. Another form of adjustment-buckle mechanism suitable for use on the invention is a belt-buckle type set where one side includes a tongue and the other side includes a series of holes in the strap into which the tongue can secure. The belt-buckle type set is particularly suited for a leather carrier. It is not required that adjustment buckles always be used for the binding straps of this invention. If thin straps are used, the straps can simply be tied around the article being carried, thus securing the item and adjusting the length without a buckle. An important feature of this invention is that the binding straps are independent of the mounting straps so that the carrier can be adapted to fit a wide range of vehicles and hold items of various sizes. It is possible to extend the binding straps by adding additional straps each having one part of a adjustment-buckle-connector set on one side and the other part on the other side.

In another embodiment of the invention, some or all of the binding straps and/or mounting straps which cross the pad in the previous embodiment with a free side on each side of the pad, are replaced by a pair of opposing straps, one strap on each side of the pad, each of which straps is attached to the pad near an edge of the pad without extending across the pad. Each of these straps is equipped and functions exactly like one side of the straps in the previous embodiment. This embodiment is particularly suited for a leather pad and straps.

Preferred dimensions for the pad are about 12 to 15 inches wide by about 30 to 36 inches long, with mounting straps of about 48 inches long crossing the width of the pad and about 60 inches crossing the length. The fabric portion of the binding straps and mounting straps are preferably 1 to 2 inches wide.

In a preferred embodiment, where a two layer mounting pad is used with the straps passing between the layers, the following assembly order is preferred in order to maximize the strength of the device:

First lay down the bottom pad layer;

Second lay down the binding straps which cross the two long edges of the pad;

Third lay down the binding straps which cross the two short edges of the pad;

Fourth lay down the mounting straps which cross the two long edges of the pad;

Fifth lay down the mounting straps which cross the two short edges of the pad; and Fifth lay down the top pad layer.

The device is deployed on a passenger car by attaching the mounting strap hooks on one of the long sides of the pad under the hinged side of the trunk lid so that the pad rests on the horizontal portion of the trunk lid as much as possible and then bends to conform with the remainder of trunk lid, attaching the mounting straps on the short sides of the pad under the trunk lid sides and tightening the fit with the adjustment connector on the short sides, attaching the mounting strap hooks on the remaining long side of the pad under the opening side of the trunk lid, and tightening the fit with the adjustment connector on the long sides. On most vehicle this can be accomplished without opening the trunk lid. Depending on the size and proportions of the trunk lid, the pad may rest entirely on the horizontal surface of the trunk lid or bend around the lid and rest part on the horizontal surface and part on the vertical surface. The item to be carried is rested on the closed trunk lid preferably in part on the horizontal surface of the trunk lid and secured in place by the binding straps the ends of which are fastened together by fastening the parts of the connection buckle and tightening the adjustment connector. If there is a spoiler on the trunk, the pad is preferably passed under the spoiler so that the pad rests on the trunk surface. The carrier is deployed vertically on the tail gate of a utility vehicle. The binding straps can be extended to hold a large item by attaching extension straps which include one part of a buckle-adjustment set on either end to the binding straps on the pad.

The carrier is removed by removing the package, and removing the hooks from around the trunk. The carrier can be rolled up into a tight cylinder for storage.

It should be clear that the carrier thus described can be deployed on a wide range of automobile trunk lids, largely without regard to the size of the horizontal portion of the trunk lid, can be deployed and removed rapidly, and can be rolled into a tight cylinder for storage.

Although the present invention has been described in considerable detail with reference to certain preferred versions thereof other versions are possible. Therefore the spirit and scope of the appended claims should not be limited to the preferred versions herein.

I claim:

1. A package carrier for vehicles comprising:

a substantially rectangular, flat, flexible, pad having a first and a second long edge and a first and a second short edge;

a plurality of elongated flexible mounting straps, each mounting strap comprising a fabric strip, two broad, flat hooks, and an adjustment connector, wherein at least two of the mounting straps traverse the pad across the first and second long edges, the fabric strip of each mounting strap being attached to the pad proximate to each of the edges it crosses and extending beyond each of the edges it crosses whereby each mounting strap has a first and second free side, and wherein one of said hooks is attached to the end of the fabric strip of each free side of each mounting-strap, and wherein the first free side of each mounting strap further comprises an adjustment connector which is attached to the fabric strip between the hook and the pad;

a plurality of elongated fabric binding straps, wherein at least three of the binding straps traverse the pad across the first and second long edges and at least two of the binding straps traverse the pad across the first and second short edges, each of the binding straps being attached to the pad proximate to each of the edges it crosses and extending beyond each of the edges it crosses whereby each binding strap has two free sides;

whereby said package carrier is capable of being securely attached to said vehicle by said mounting straps while conforming to the vehicle surfaces to which it is attached, and when so attached a package may be secured by said binding straps, and when removed from the vehicle said package carrier is capable of being rolled into a tight cylindrical shape for storage.

2. The package carrier defined in claim 1, wherein at least one of the mounting straps traverses the pad across the first and second short edges.

3. The package carrier defined in claim 2, wherein each binding strap further comprises a buckle-adjustment connector said buckle-connector comprising a first part and a second part such that one first part is attached to one free side of said binding strap and one of said second part is attached to the second free side of said binding strap.

4. The package carrier defined in claim 3, wherein each of at least two of said mounting straps attached proximate to said first long edge and said second long edge further comprise a pivotal connector attached to the first free side of said strap.

5. The package carrier defined in claim 4, wherein said pad is made from woven polyvinyl chloride matting and said straps are made from nylon webbing.

6. The package carrier defined in claim 5, wherein said pad comprises an upper layer and a lower layer and said binding straps and said mounting straps pass between said upper layer and said lower layer and are attached to each of said layers.

7. The package carrier defined in claim 6 wherein said pad further comprises a plurality of grommets defining holes in said carrier, said grommets being attached to the carrier proximate to each of the long and short edges, whereby a protective cover can be attached to said pad by threading a chord through the grommets.

8. The package carrier defined in claim 7 wherein said broad, flat hooks are made of metal coated with plastic.

9. The package carrier defined in claim 8 wherein there are three mounting straps attached proximate to said long edges, one mounting strap attached proximate to said short edges, four binding straps attached proximate to said long edges, and two binding straps attached to said short edges.

10. The package carrier defined in claim 9 wherein the side of each of said mounting straps which extends from the pad on the side containing the first long edge is equipped with both adjustment connector and pivotal connector, and the side of each of said mounting straps which extends from the pad on the side containing the second long edge is equipped with adjustment connector and each side of the mounting strap which is attached proximate to the short edges is equipped with a pivotal connector and an adjustment connector.

11. The package carrier defined in claim 10 wherein said adjustment connectors are integrated-snap-buckle-adjustment sets.

12. A package carrier for vehicles comprising:
a substantially rectangular, flat, flexible, pad having a first and a second long edges and a first and a second short edges;
a plurality of elongated, flexible mounting straps, each mounting strap comprising a fabric strip and a broad flat hook, wherein at least two of said mounting straps are attached to the pad proximate to the first long edge, at least two of said mounting straps are attached to the pad proximate to the second long edge, and wherein said mounting straps are arranged in pairs of two members each such that for each mounting strap attached proximate to the first long edge there is a mounting strap directly opposite attached proximate to the second long edge, and wherein each of said mounting straps is attached to the pad proximate to the respective edge by one end of the fabric strip and the hook is attached to the other end of the fabric strip, and wherein at least one member of each pair of mounting straps further comprises an adjustment connector attached to the fabric strip between the hook and the pad;
a plurality of elongated flexible binding straps, wherein at least three of said binding straps are attached proximate to the first long edge, at least three of said binding straps are attached proximate to the second long edge, at least two of said binding straps are attached proximate to the first short edge, and least two of said binding straps are attached proximate to the second short edge, wherein said binding straps are positioned about said pad in pairs of two members each such that for each of said binding straps attached proximate to said first long edge there is a binding strap attached directly opposite from it attached proximate to said second long edge and for each binding strap attached proximate to said first short edge there is a binding strap attached directly opposite from it attached proximate to said second short edge, and wherein each binding strap is attached to the respective edge at one end of the strap and the other end extends freely away from the pad;
whereby said package carrier is capable of being securely attached to said vehicle by said mounting straps while conforming to the vehicle surfaces to which it is attached, and when so attached a package may be secured by said binding straps, and when removed from the vehicle said package carrier is capable of being rolled into a tight cylindrical shape for compact storage.

13. The package carrier defined in claim 12 at least one of said mounting straps is attached to the pad proximate to the first short edge, and at least one of said mounting straps is attached to said pad proximate to the second short edge and for each mounting strap attached proximate to the first short edge there is a mounting strap attached directly opposite proximate to the second short edge.

14. The package carrier defined in claim 13, wherein each pair of binding straps further comprises a buckle-adjustment connector, said connector comprising a first part and a second part, such that there is one first part attached to one member of said pair and one second part attached to the other member of said pair.

15. The package carrier defined in claim 14, wherein each of at least two of said mounting straps which are attached proximate to said first long edge further comprises a pivotal connector attached to the fabric strip of said mounting strap between said pad said hook.

16. The package carrier defined in claim 15 wherein said pad is made from woven polyvinyl chloride matting and said straps are made from nylon webbing.

17. The package carrier defined in claim 16 wherein said pad comprises an upper layer and a lower layer and each of said binding straps and said mounting straps are attached to each of said layers between said upper layer and said lower layer.

18. The package carrier defined in claim 16 wherein said pad further comprises a plurality of grommets defining holes in said carrier, said grommets being attached to the carrier proximate to each of the long and short edges, whereby a protective cover can be attached to said pad by threading a chord through the grommets.

19. The package carrier defined in claim 18 wherein said broad, flat hooks are made of metal coated with plastic.

20. The package carrier defined in claim 19 wherein there are three mounting straps attached proximate to each of said long edges, one mounting strap attached proximate to each of said short edges, four binding straps attached proximate to each of said long edges, and two binding straps attached proximate to each of said short edges.

21. The package carrier defined in claim 20 wherein two of said mounting straps attached proximate to said first long edge are equipped with pivotal connector, each of said mounting straps attached proximate to said first long edge, and said second long edge are equipped with adjustment connector, and each of said mounting straps attached proximate to said first short edge and said second short edge are equipped with both a pivotal connector and a buckle adjustment connector.

22. The package carrier defined in claim 21, wherein said adjustment connectors are integrated-snap-buckle-adjustment sets.

* * * * *